United States Patent [19]

Fox

[11] Patent Number: 4,713,867

[45] Date of Patent: Dec. 22, 1987

[54] PISTON RINGS WITH A GAP SEAL

[76] Inventor: Duke Fox, 5305 Towson, Fort Smith, Ak. 72901

[21] Appl. No.: 723,097

[22] Filed: Apr. 15, 1985

[51] Int. Cl.[4] ............................................. B23P 15/06
[52] U.S. Cl. ................................ 29/156.6; 29/156.62; 29/418; 29/423; 29/526 R
[58] Field of Search ............ 29/156.6, 156.62, 156.63, 29/418, 423, 526 R, 222, 269; 277/220, 221, 222

[56] References Cited

U.S. PATENT DOCUMENTS

| 1,340,037 | 5/1920 | Fosston | 29/156.62 |
|---|---|---|---|
| 1,450,200 | 4/1923 | Bruninga | 29/156.62 |
| 1,458,248 | 6/1923 | Seifert | 29/156.6 |
| 1,459,117 | 6/1923 | Seifert | 29/156.6 |
| 1,666,343 | 4/1928 | Okochi et al. | 29/156.62 |
| 1,987,866 | 1/1935 | Olson | 29/156.6 |
| 2,098,790 | 11/1937 | Newton | 29/156.6 |
| 2,280,552 | 4/1942 | Somes | 29/156.6 |
| 2,281,426 | 4/1942 | Farr | 29/156.6 |
| 3,655,208 | 4/1972 | Walker | 29/156.6 |

Primary Examiner—Howard N. Goldberg
Assistant Examiner—Irene Graves Golabi
Attorney, Agent, or Firm—Laff, Whitesel, Conte & Saret

[57] ABSTRACT

A process for manufacturing a piston ring includes the step of forming a gap seal from an elongated member on one side and an "L-shape" on the other side; compressing the ring to close the gap seal and move the two ends into a nesting position; welding a wire across the outside surface of the ring to hold it in that compressed condition; placing a plurality of such compressed rings onto a mandrel; and tightly clamping them in axially aligned positions. The surfaces of the clamped rings are then ground into a cylindrical surface which simultaneously removes the wire and the weld. The nested ends including the elongated member and the "L-shaped" member nest together when compressed into a cylinder.

15 Claims, 9 Drawing Figures

U.S. Patent    Dec. 22, 1987    Sheet 1 of 1    4,713,867
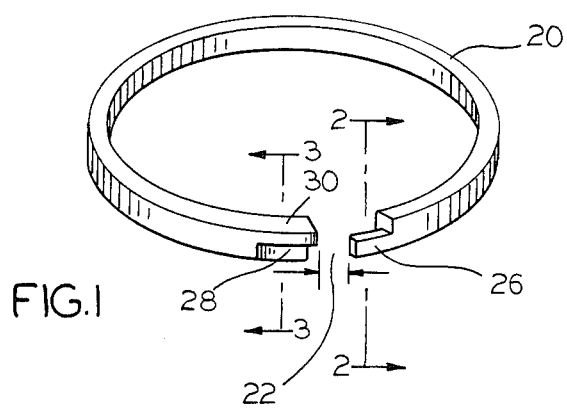
FIG.1
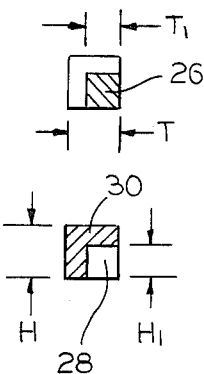
FIG.2
FIG.3
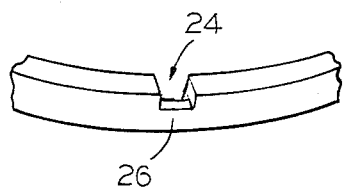
FIG.4
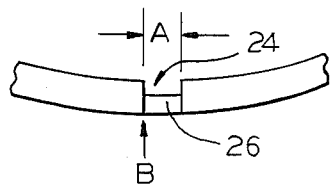
FIG.5
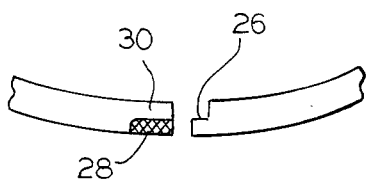
FIG.6
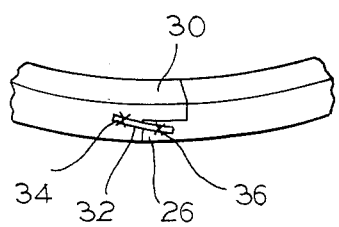
FIG.7
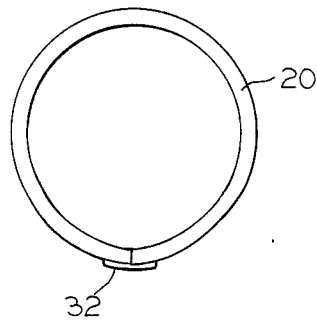
FIG.8
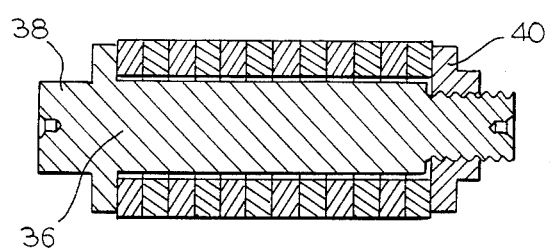
FIG.9

PISTON RINGS WITH A GAP SEAL

This invention relates to piston rings with a gap seal and, more particularly, to means for and methods of manufacturing such piston rings.

Piston rings are, of course, well known devices used to maintain compression within a cylinder. The cylinder may be part of an engine, an air conditioning compressor, or the like. The ring is split so that it may be expanded slightly and slipped over a piston and into a circumferential groove. The ring should be perfectly round in the operating state within the cylinder. However, it is made oversize with a gap in the free state; therefore, it becomes somewhat eggshaped when the ring ends of the gap are squeezed together, to be fitted into a cylinder. Thus, the compression leakage within the cylinder is relatively great past the areas that the ring fails to fit.

Few people understand the forces involved in a piston ring seal. An automobile piston ring, for example, having a four-inch outside diameter and ¼-inch height has about three square inches of inside diameter surface area. At a firing pressure of 300 p.s.i., there is close to one-half ton seal pressure on one single piston ring. It is this pressure on the cylinder wall, and comparable pressure on the bottom of the ring groove that seals the compression, not the few ounces of ring spring pressure that is commonly credited with making the compression seal. If the pressure in back of the ring is allowed to escape through the ring gap at a rate which is sufficient to materially lower the seal pressure, the pressure can bleed down the outside diameter. Once this has started, the ring will collapse because the outside diameter of the ring has more area than the inside diameter of the ring has.

The power output, fuel efficiency, ease of starting and engine life are all directly related to the sealing efficiency of the piston rings. Although, there have been many attempts to improve their performance by various gap seal designs and methods of shaping the rings to make them fit the cylinder better, none of these attempts have sufficiently improved performance to have any material effect upon the commercial marketplace. As a result, today's compression rings remain essentially the same as they have been for eighty, or so, years. A butt jointed ring that is perfectly round in the free state (usually with some gap relief), fits within the cylinder so poorly that it is common practice to intentionally roughen the cylinder walls enough to wear the outside diameter of the ring to fit the cylinder. This initial break-in period is inconvenient and consumes metal that would otherwise extend engine life.

U.S. Pat. No. 1,666,343, by Okochi et al. describes the roundness problem which is encountered when a piston ring is used. They correctly state that if the ends of the rings can be fastened together in a flexible manner, the outside diameter may be trued to produce a well fitting ring. However, Okochi et al's solution to the roundness problem is too slow and expensive. Their pin design becomes a watchmaker's nightmare if their invention is practiced on smaller sized rings, such as those normally used on chainsaw and motorcycle motors. Furthermore, the Okochi et al. solution makes it impossible to incorporate an effective gap seal without piecing the piston ring and thereby introducing new problems.

The Okochi et al. Z-gap seal has a lap which extends from the outside to the inside of the ring and the cylinder pressure appears at the inside of the ring. Once the pressure gets behind the ring (i.e. the pressure is travelling behind the ring and vertically along the back of the piston groove wall), the pressure will blow through the gap in the piston ring regardless of whether the gaps are or or are not staggered. However, it is not the blowing through the gap that does the harm. It is the resulting loss of the pressure that holds the ring against the cylinder wall which causes trouble. Once that cylinder wall pressure is relaxed, all of the power blows down the cylinder wall.

Accordingly, an object of the invention is to provide new and improved means for and methods of manufacturing piston rings. In this connection, an object is to provide piston rings which have a gap seal that preserves the back pressure within the cylinder. Here, an object is to provide a piston ring which maintains its circularity despite any flexing which may occur as the piston ring assumes a true round or circular outside diameter when it is compressed in a cylinder.

Another object of the invention is to extend engine life. Here, an object is to reduce the amount of metal that erodes from the piston ring and cylinder wall during a break-in period.

In keeping with an aspect of the invention, these and other objects are accomplished by providing a longitudinal slot adjacent the gap and along a short length at one end of a piston ring. The opposite end of the piston ring has a mating elongated portion which fits and nests into the slot when the ring is compressed. Originally, the piston rings are made oversize so that the elongated portion fits into the slot when the ring is squeezed, thereby causing the gap to all but disappear. A wire or ribbon is then welded across the nested ends to hold the ring in the squeezed or closed condition. Both sides of the welded rings are surface ground to eliminate any mismatch at the nested end of the ring. A number of those closed rings are then fit onto a mandrel which almost exactly fits the inside diameter. The rings are clamped tightly on the mandrel, and they are then ground or trued to provide a perfectly circular outside diameter of the ring in the squeezed condition. This grinding also removes wire or ribbon and all discontinuities that occurred when the wire was welded into place to secure the ring in the squeezed or closed condition.

A preferred embodiment of the invention, and a method for making it, are illustrated in the attached drawings, wherein:

FIG. 1 is a perspective view of the inventive piston ring;

FIGS. 2 and 3 are cross section views taken along lines 2—2 and 3—3, respectively, of FIG. 1;

FIGS 4 and 5 are perspective and front views of a first step in the manufacturing process;

FIG. 6 is a bottom plan view of a second step in the manufacturing process;

FIG. 7 is a front perspective view of a third step in the manufacturing process;

FIG. 8 is a greatly exaggerated top plan view of the compressed piston ring, which illustrates a problem in both manufacturing and use which the invention overcomes; and FIG. 9 is a cross section view of a mandrel for correcting the problem illustrated in FIG. 8.

A piston ring 20 must have a gap 22 so that it may be slightly spread apart to slip over the outside diameter of a piston. The piston ring is then slipped down the piston to a point where it fits into a circumferential groove which has been milled or otherwise formed around the perimeter of the piston.

After the piston ring fits into the groove, the gap 22 remains. The burning and exploding gasoline above the piston ring creates a firing pressure of approximately one-half ton upon the upper surface of the piston ring. This pressure acts on and passes through the gap. Therefore, it is desirable to have a gap seal.

A number of different patents have means for eliminating or reducing the gap, such as U.S. Pat. Nos. 3,655,208; 3,100,929; 1,859,057; 1,386,997; 1,316,463; 1,219,270; 1,083,130. However, it is thought that none of these patents solve the problem. Perhaps, the most interesting is U.S. Pat. No. 1,386,997, by Richard P. Elliott, which is a standard approach for making piston rings. A first problem with this method is cost. A second problem is that it is difficult or impossible to clamp the ring without causing some distortion. This patent shows a standard stepped gap or "Z-gap." As a result, the Elliott "gap seal" is considerably less than completely successful.

The inventive piston ring is seen in FIG. 1, wherein one end 30 of the piston ring has a milled slot to give an "L-shaped" cross section, as seen in FIG. 3. This is called the "female end." The other end 26 has a generally square cross section, as seen in FIG. 2. This is called the "male end." These two ends nest when the piston ring is in its operating condition. Properly installed, the female "L" is on the inside and top, and the male tongue is on the bottom and outside. Even though there is considerable wear and, hence, a gap, pressure cannot pass from either the top or back of the ring because the tongue forms a closure. Pressure cannot pass through the gap at the end of the male tongue because it is stopped by the arms of the L-shaped female end.

The method of making the piston ring is seen in FIGS. 4-9. First, a solid, circular ring with rectangular cross section is made allowing approximately 0.010 cleanup on the thickness or height. The outside diameter should be approximately 7% over the finish bore size and the inside diameter should be approximately 4% under the finish bore size. These sizes can vary somewhat, since the material ring size and desired free gap and cleanup may vary.

Next, a cut 24 is made into the ring by a suitable milling or grinding tool, the cut being made horizontally on the top of the piston ring and vertically on the inside diameter of the ring. In one embodiment, the width A (FIG. 5) of the cut is 18% of the bore. The cuts resulting from these two cuts remove approximately 35% of the material so that the remaining material is approximately 65% as high and 65% as wide as the original, starting ring dimensions.

Next, a suitable slot is formed at B (FIG. 5), thereby leaving the male end 26.

The opposite end of the ring (FIG. 6) has a longitudinal slot 28 milled therein to nest with the end 26 when the ring is compressed. Since the end 26 was formed in FIGS. 4, 5 by removing approximately 35% of the ring thickness in each of two dimensions, the longitudinal slot 28 is formed by cutting away approximately 65% of the material in a corresponding two dimensions, so that an L-shape female end 30 remains with a thickness which is approximately 35% of the original ring dimensions in both the vertical and horizontal dimensions.

The foregoing example of 65% and 35% are dimensions which have been selected for many reasons, such as ease of manufacture, installation, etc. However, these particular dimensions are not critical and may vary from one type ring to another type of ring, depending upon a number of other considerations.

The following manufacturing step is to nest the ends 26, 30 as snuggly as possible and in the closest alignment possible. The ends are then bound into position by spot welding a thin wire or ribbon 32 (FIG. 7) across the gap. The welds are made at 34, 36 and on the vertical face at the outside diameter of the ring. The wire may have an 0.008-inch diameter and may be welded in place by a spot welder which is used to make electron tubes.

Since the original ring was as perfectly circular as possible, and further, since the circumference has been reduced by the width of the cut, the compressed ring with the wire 32 welded in place will be less than a perfect circle. This distortion of the circle is shown very greatly exaggerated in FIG. 8, in order to highlight the problem.

The opposite sides of the closed rings are ground to a finished size to eliminate any mismatch where the ends of members 26, 30 abut against each other. After the surface grinding is complete, the opposite surfaces of the rings are smooth, planar and parallel. This grinding may be done on a double disc grinder or on a surface grinder.

Thereafter, a number of these "distorted" rings are placed onto a mandrel 36 in the form of a bolt having a large head 38 against which a stack of the rings may abut. The opposite end of the mandrel is threaded to receive a nut 40. Since the adjacent surfaces of the rings are smooth and parallel, the nut 4 may be drawn tightly enough to clamp all of the rings into a fixed position from which they will not move.

Then, the collective surfaces of the clamped rings may be ground to become a perfectly cylindrical surface. This grinding removes the wire 32 and all evidence of the spot welding at 34, 36 (FIG. 7). The rings do not spring out of shape when the wire disappears because they are clamped so very tightly by the nut 40.

When the nut 40 is removed, all of the rings are perfectly round on their outside dimensions when compressed to fit inside the cylinder, and the opposing horizontal sides are planar.

Any suitable surface treatments may now be given to the ring. In general, these treatments may include any of the known treatments of piston rings.

An advantage of the invention is that it provides an effective gap seal which fits within a few ten-thousandths of an inch. Such a fragile part is extremely slow and difficult to reach within these precision fittings. Likewise, shaping the outside diameter to the proper double involute contour to be within tolerances exceeds the capability of currently available production machinery. The invention solves the problems by combining a superior gap seal design with a manufacturing process.

Those who are skilled in the art will readily perceive how to modify the invention. Therefore, the appended claims are to be construed to cover all equivalent structures which fall within the true scope and spirit of the invention.

I claim:
1. A process for making a piston ring, said process comprising the steps of:
   forming a circular ring;
   forming a cut on the top edge and on the inside diameter cylindrical wall of the ring;

transversely slotting the ring at an end of the cut, thereby forming a gap with an associated elongated member;

forming a longitudinal slot along an edge of said ring adjacent said transverse slot, said elongated member nesting in said longitudinal slot when said ring is compressed to close said gap;

securing the ends of a flexible member extending across the slot exclusively on the outside diameter wall of said ring to hold said gap closed with said ring in said compressed state, said ring being otherwise unrestrained;

placing a plurality of said rings secured by said flexible member onto a mandrel and securely clamping said rings in abutment, whereby cumulative outside surfaces of said rings form an outside cylindrical wall; and grinding said cumulative surfaces to form said secured and compressed rings into a substantially perfect circle, thereby completely removing entirely all of both said flexible member and the securing which attached said flexible member on said outside diameter wall of said ring.

2. The process of claim 1 wherein said elongated member has approximately 65% of the height and width of said ring; and said elongated slot forms an L-shaped cross section, each side of the L being approximately 35% of the height and width of said ring.

3. The process of claim 1 and the added step of finishing the surface of the piston ring.

4. The process of claim 1 wherein said circular ring is overside as compared to the desired final size and said surfaces are ground to said desired final size.

5. The process of claim 1 wherein the top and bottom sides of said compressed piston ring are ground to form two spaced parallel planes after said flexible member is secured in place and before being threaded onto said mandrel.

6. The process of claim 1 wherein said flexible member is a wire which is approximately 0.008-inches in diameter and said securing step includes spot welding the ends of said wire to the outside diameter surface of said ring.

7. A process for manufacturing piston rings comprising the steps of:

(a) forming an oversize piston ring having gap seal ends which nest together when compressed;

(b) attaching a holding means across said gap seal while said ring is compressed with said gap end forced into a closed and nesting position, both the holding means and attachment being on the outer surface forming the outside diameter of the ring, said ring being unrestrained except for said holding means;

(c) tightly clamping together a plurality of said rings with their collective outside surfaces formed into a generally cylindrical wall, said ring being held by only said holding means while it is being clamped so that internal stress within the rings equalize themselves to a naturally occurring minimum spring potential; and (d) grinding said outside cylindrical wall to size said rings and to completely remove all of both said holding means and said attachment.

8. The process of claim 7 and the added step of grinding the opposed surfaces of said ring to form spaced parallel surfaces while said ring is being held in said compressed state solely by said holding means whereby said nested ends are in substantially perfect alignment at the time when said rings are tightly clamped.

9. The process of claim 7 wherein said gap seal end comprises a longitudinal slot forming an L-shaped cross section on one end and an elongated member on the other end for nesting in said longitudinal slot.

10. The process of claim 7 wherein said L-shaped cross section presents an unbroken surface at the top and at the back of the ring.

11. A process for making piston rings having an outside circumference and a gap, said process comprising the steps of: drawing the ends of a piston ring together to close said gap and attaching to the outside circumference of said closed ring a flexible attachment member extending across said ends and attached to the ring on both sides of the closed gap, said ring being unrestrained except for said flexible attachment member, and forming to a substantially true circle the outside diameter of said ring while it is being held closed by said flexible attaching member, said forming step making said ring have an outside contour which fits a circular cross section of a cylinder without introducing any substantially uneven radial forces into said ring, said forming step removing the entire flexible attachment member.

12. The process of claim 11 and the added steps of machining the ends of said rings, and then drawing together the resulting machined surfaces, and truing any mismatch of the top and bottom surfaces while said ring is being held solely by said flexible attachment.

13. The process of claim 11 wherein said flexible attachment for holding the ring ends together is a fine wire or metal ribbon welded across the gap on the outside surface of said ring.

14. The process of claim 11 wherein the top and bottom sides of said drawn together piston ring are formed into two spaced parallel planes while said flexible attachmewnt is in place and the added step of clamping a plurality of said rings onto a mandrel with said parallel planes of said rings confronting each other and while said gap is held together solely by said flexible member.

15. The process of claim 11 wherein said flexible attachment is a wire which is approximately 0.008-inches in diameter and ends of said wire are spot welded to the outside diameter surface of said ring.

* * * * *